United States Patent
Kashiwazaki

(10) Patent No.: US 6,753,902 B1
(45) Date of Patent: Jun. 22, 2004

(54) IMAGE PROCESSING APPARATUS, IMAGE PROCESSING METHOD, NAVIGATION APPARATUS, PROGRAM STORAGE DEVICE AND COMPUTER DATA SIGNAL EMBODIED IN CARRIER WAVE

(75) Inventor: Takashi Kashiwazaki, Kawagoe (JP)

(73) Assignee: Pioneer Corporation, Tokyo-To (JP)

( * ) Notice: Subject to any disclaimer, the term of this patent is extended or adjusted under 35 U.S.C. 154(b) by 826 days.

(21) Appl. No.: 09/625,352

(22) Filed: Jul. 25, 2000

(30) Foreign Application Priority Data

Jul. 26, 1999 (JP) .......................................... P11-211273

(51) Int. Cl.[7] .................................................. H04N 9/47
(52) U.S. Cl. ........................ 348/119; 340/437; 382/104
(58) Field of Search ................................ 348/148, 116, 348/118, 119, 169; 340/937, 437; 382/103, 104

(56) References Cited

U.S. PATENT DOCUMENTS

| | | | |
|---|---|---|---|
| 5,555,312 A | | 9/1996 | Shima et al. ............... 382/104 |
| 5,661,472 A | * | 8/1997 | Koshizawa ................. 340/901 |
| 5,757,287 A | | 5/1998 | Kitamura et al. ........... 340/937 |
| 5,790,403 A | * | 8/1998 | Nakayama ................... 701/28 |
| 6,075,559 A | * | 6/2000 | Harada ........................ 348/148 |
| 6,091,833 A | * | 7/2000 | Yasui et al. ................. 382/104 |

FOREIGN PATENT DOCUMENTS

| | | | |
|---|---|---|---|
| EP | 0 720 075 A2 | 7/1996 | ............ G05D/1/02 |
| EP | 0 827 127 A1 | 3/1998 | ............ G08G/1/16 |
| EP | 0 939 297 A2 | 9/1999 | ........... G01C/21/20 |
| JP | 9-178505 | 7/1997 | ........... G01C/21/00 |

OTHER PUBLICATIONS

"Dynamic segmentation of traffic scenes" by Andrea Giachetti, Marco Cappello, and Vincent Torre, pp. 258–263.*

"Road Tracking, Lane Segmentation and Obstacle Recognition by Mathematical Morphology" by Xuan Yu, Serge Beucher and Michel Bilodeau, pp. 166–172.*

* cited by examiner

*Primary Examiner*—Chris Kelley
*Assistant Examiner*—Erick Rekstad
(74) *Attorney, Agent, or Firm*—Sughrue Mion, PLLC

(57) ABSTRACT

An image processing apparatus is provided with: an image taking device (19) for taking an image in a forward direction of a movable body and outputting an image signal corresponding to the taken image; a movement vector detecting device (18, 24) for detecting a movement vector for each area of the image taken by the image taking device, on the basis of the image signal while the movable body is moving; and a distance calculating device (18, 25) for setting a standard line at a predetermined image position crossing a road edge with respect to the image taken by the image taking device, and calculating the distance to the road edge on the basis of a distribution of the movement vector on the standard line.

20 Claims, 12 Drawing Sheets

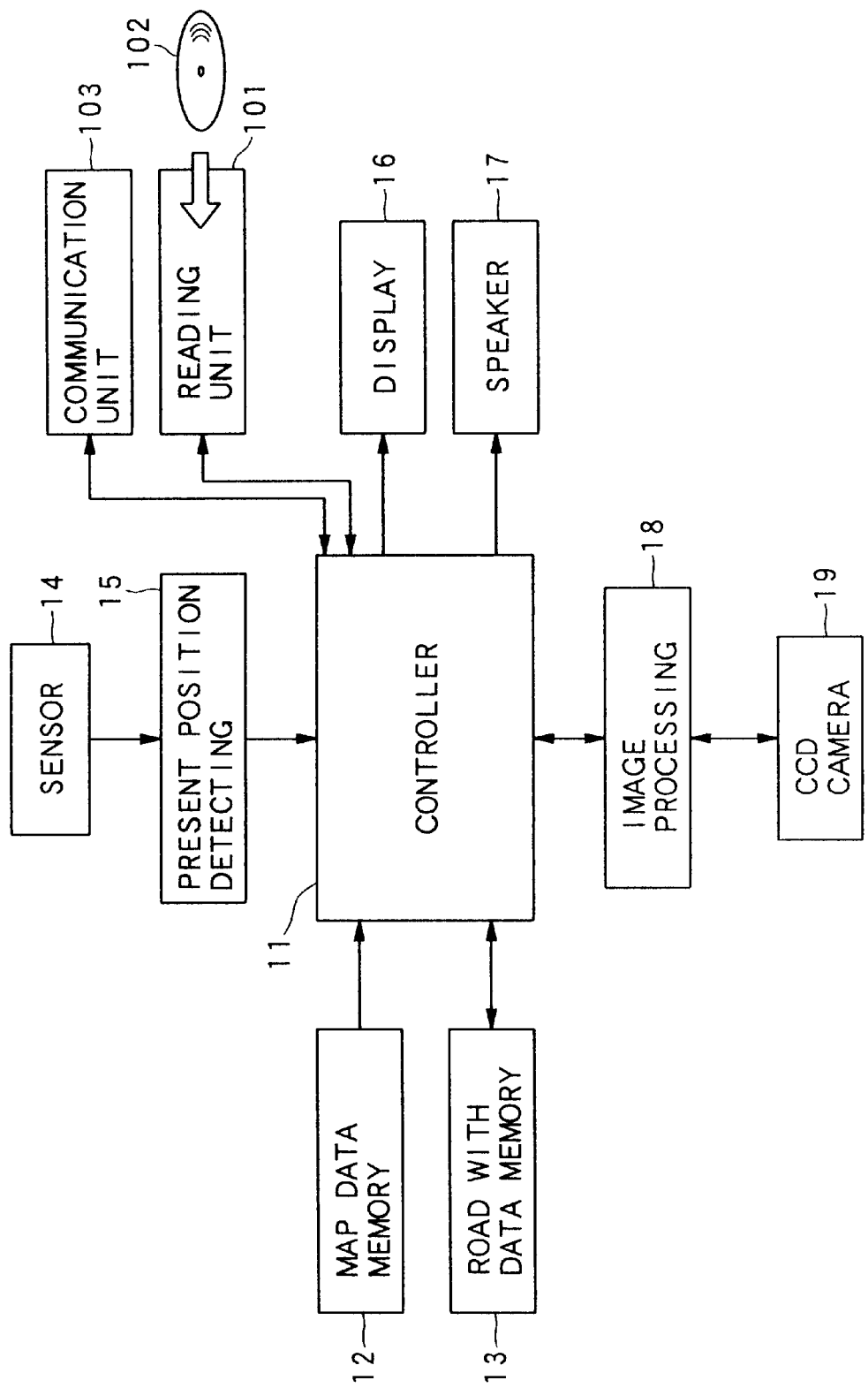

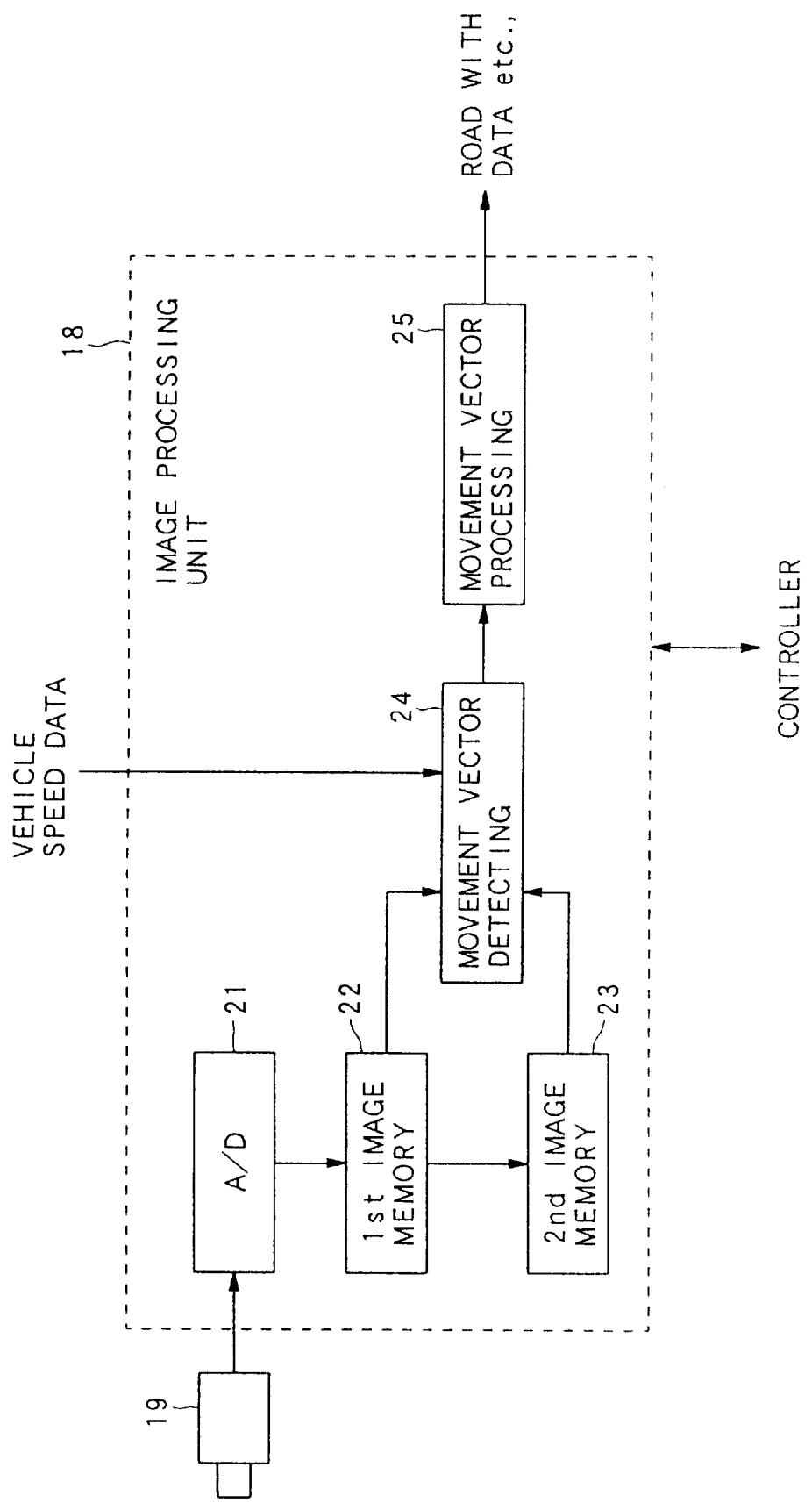

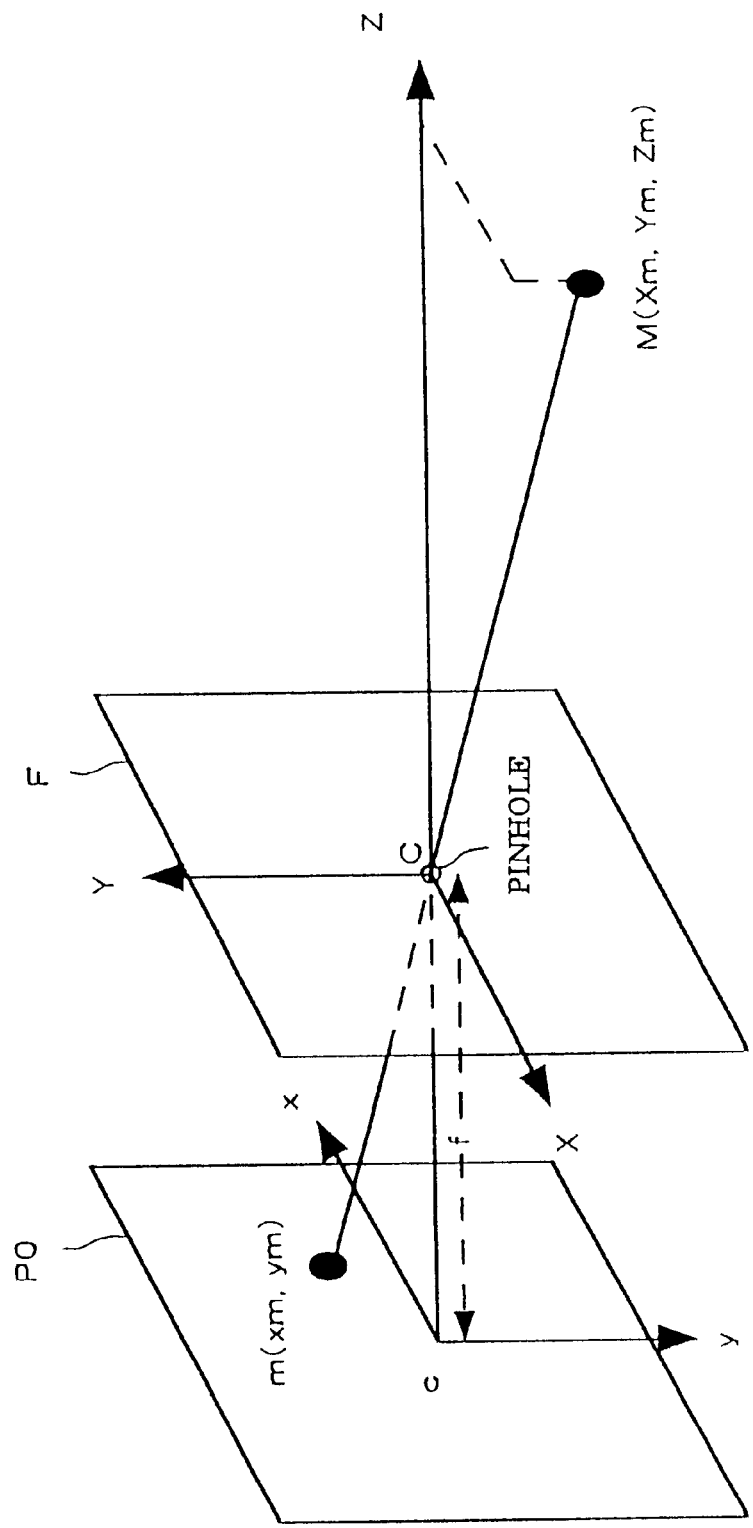

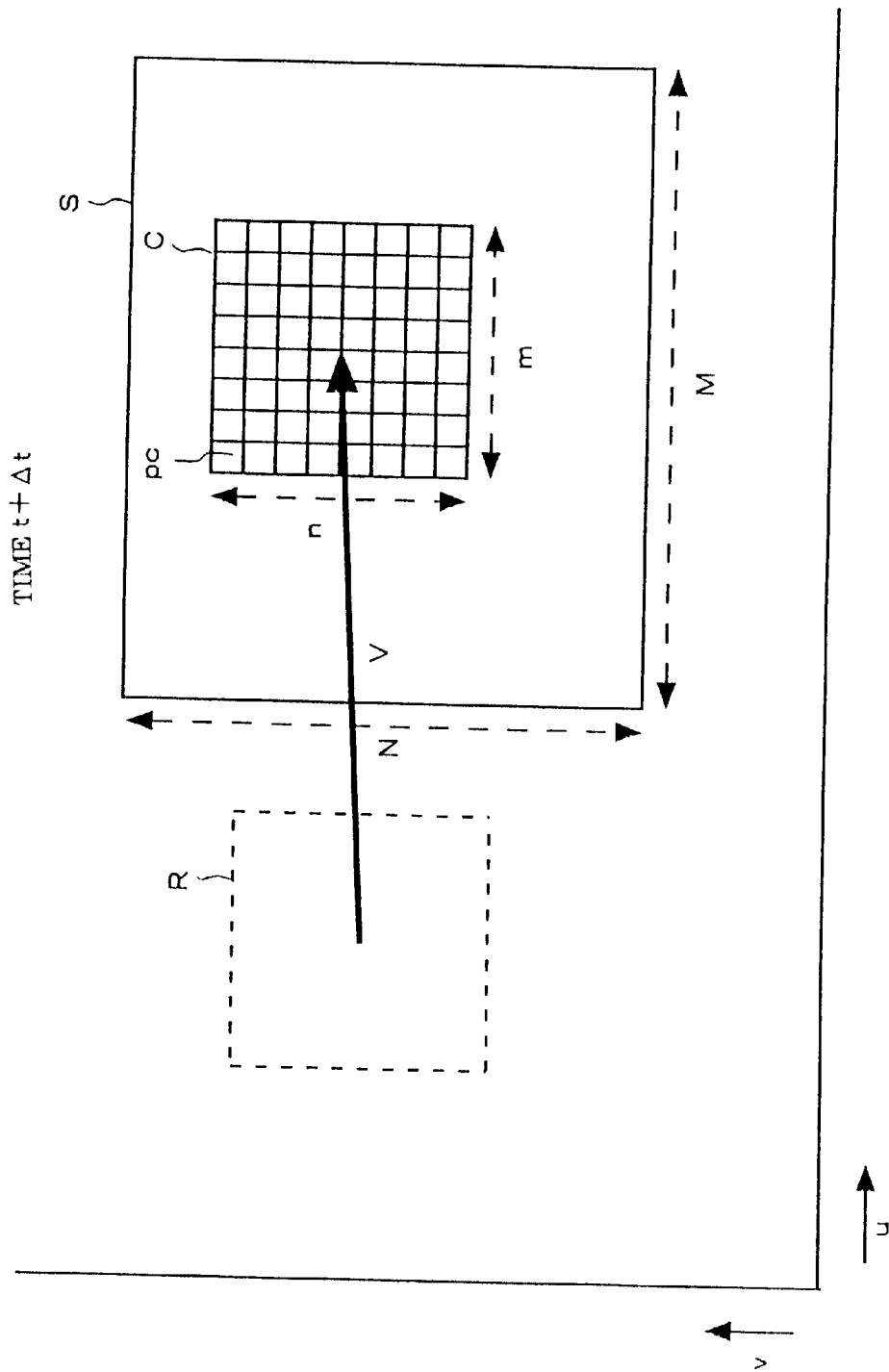

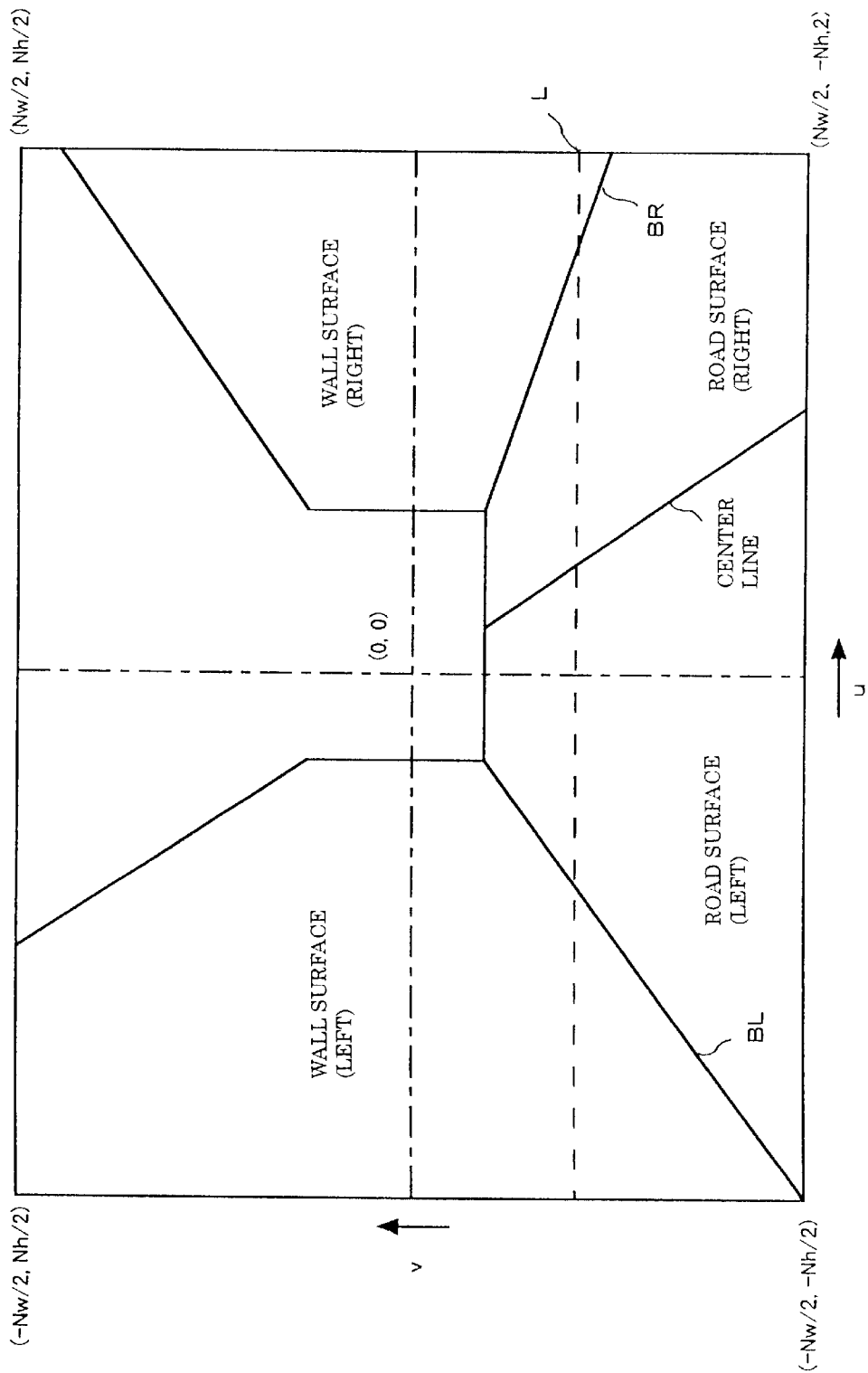

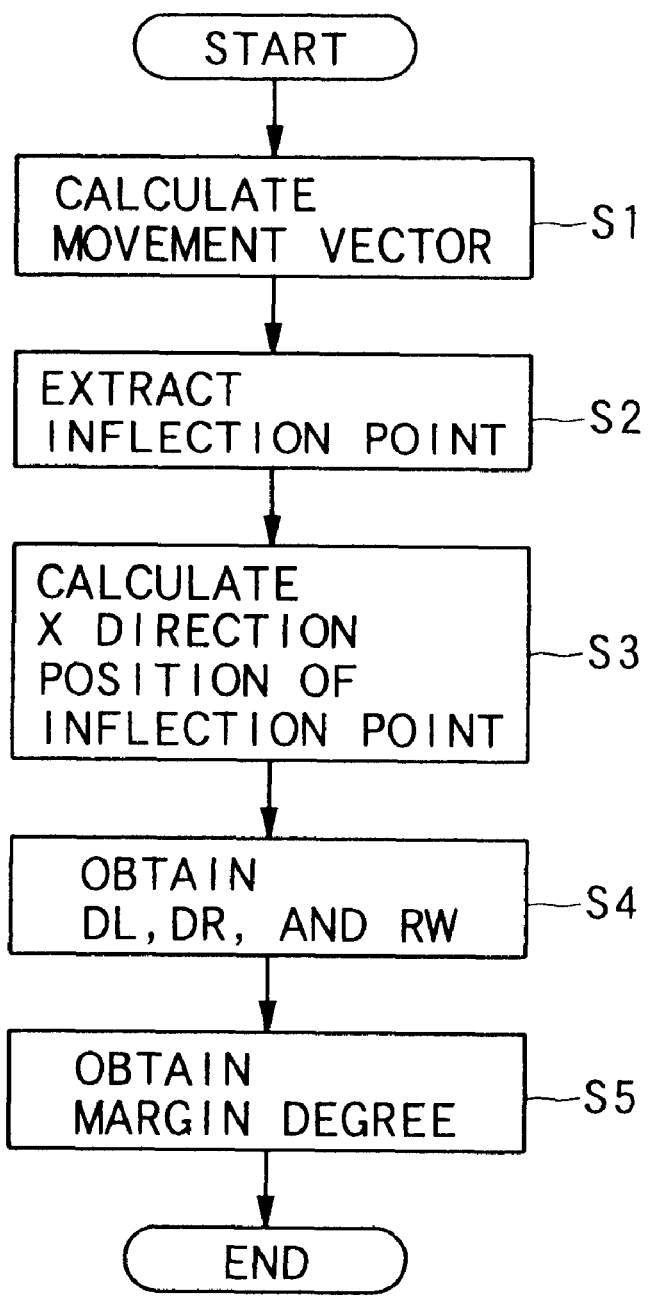

IMAGE PROCESSING APPARATUS, IMAGE PROCESSING METHOD, NAVIGATION APPARATUS, PROGRAM STORAGE DEVICE AND COMPUTER DATA SIGNAL EMBODIED IN CARRIER WAVE

BACKGROUND OF THE INVENTION

1. Field of the Invention

The present invention generally relates to an image processing apparatus, an image processing method and a navigation apparatus, which can obtain a distance to a road edge and a road width on the basis of an image signal from an image taking device (e.g., a motion picture camera) in a vehicle, which is presently traveling. The present invention also relates to a program storage device for storing a program and a computer data signal embodied in a carrier wave, which enable a computer to function as such an image processing apparatus.

2. Description of the Related Art

There is a navigation apparatus, which detects a present position of a vehicle as a movable body, and displays the detected present position together with a road map around it, to thereby conduct a route guidance. In this type of the navigation apparatus, a large storage capacity record medium (e.g., a CD-ROM, a DVD-ROM or the like), on which map data are recorded, is equipped, and is used to generate the display data displayed on a display picture plane. The map data on the record medium include data related to the shape of the road and various data for display as well as road width information accompanying those. Therefore, it is possible to read out the road width information corresponding to the road on which the vehicle is presently traveling, and the road width of this road can be grasped.

However, according to the above mentioned navigation apparatus, the road width information included in the map data does not indicate an accurate road width, but indicates an inaccurate and rough road width of the road, such as 5.5 m to 8 m for example. Thus, it is not possible to obtain an accurate road width information finely corresponding to each point of the road.

Further, it is also desired not only to merely recognize the road width of the road but also to obtain the distance to the road edge in a real time manner so as to make the best use of it for a safe driving operation of the vehicle. On the other hand, if the principle of the tigonometrical survey is adapted by setting a plurality of cameras, the distance can be measured in a stereoscopic manner, although it is possible to obtain the distance to the road edge, the structure of the apparatus becomes complicated and the cost thereof is certainly increased.

SUMMARY OF THE INVENTION

It is therefore an object of the present invention to provide an image processing apparatus and an image processing method, which can obtain a distance to the road edge such as a wall surface etc., or a road width by means of a relatively simple configuration on the basis of an image taken from a presently traveling vehicle, and also a navigation apparatus, which can perform a warning or a guidance so as to secure a safe driving operation for a driver, in correspondence with a result of the image processing of the image processing apparatus, as well as a program storage device for storing a program and a computer data signal embodied in a carrier wave which enable a computer to function as such an image processing apparatus.

The above object of the present invention can be achieved by an image processing apparatus provided with: an image taking device for taking an image in a forward direction of a movable body and outputting an image signal corresponding to the taken image; a movement vector detecting device for detecting a movement vector for each area of the image taken by the image taking device, on the basis of the image signal while the movable body is moving; and a distance calculating device for setting a standard line at a predetermined image position crossing a road edge with respect to the image taken by the image taking device, and calculating the distance to the road edge on the basis of a distribution of the movement vector on the standard line.

According to the image processing apparatus of the present invention, the image taking operation in the forward direction of the movable body such as a vehicle is performed and the image signal is outputted by the image taking device while the movable body is presently moving. The image signal at one time point and the image signal at another time point are compared with each other, so that the movement vector for each area is detected. The characteristic of the movement vector on the standard line set in the image at one pixel portion corresponding to a road surface and that corresponding to a construction on the road edge are different from each other. Thus, it is possible to judge the road edge and calculate the distance to the road edge by obtaining the inflection point of the movement vector. Therefore, the calculated distance can be utilized for securing a safety in driving, aiding the navigation operation and the like, so as to improve the safety and the convenience of the movable body by means of a rather simple configuration.

In one aspect of the image processing apparatus of the present invention, the image processing apparatus is further provided with a road width calculating device for calculating a road width of the road, on which the movable body is moving, on the basis of the distance to the road edge calculated by the distance calculating device.

According to this aspect, the road width of the road on which the movable body is presently moving can be calculated on the basis of the distance to the road edge calculated in correspondence with the forward image of the movable body. For example, the road width can be obtained by adding the left and right distances. Therefore, it is possible to secure the safety in driving by using this road width, and store the road width data in correlation with map data, so that the function and safety of the navigation for the movable body can be improved.

In another aspect of the image processing apparatus of the present invention, the image processing apparatus is further provided with a margin degree judging device for judging a degree of margin with respect to the road edge of the road, on which the movable body is moving, on the basis of the distance to the road edge calculated by the distance calculating device.

According to this aspect, on the basis of the distance to the road edge calculated in correspondence with the forward image of the movable body, the margin degree with respect to the road edge of the movable body is judged. Therefore, it is possible to recognize such a condition that the movable body is too close to the road edge and have no margin or clearance, to thereby improve the safety of the movable body.

In another aspect of the image processing apparatus of the present invention, the image processing apparatus is further provided with a calibration device for calibrating an image taking direction of the image taking device on the basis of the detected movement vector.

According to this aspect, upon the operation of the image processing apparatus, the image taking direction of the image taking device is calibrated by detecting the movement vector and then determining a disappearance point for example. Therefore, the image process can be performed in consideration with the scattering of the condition of fixing the image taking device, and a rather simple calibration can be performed since the movement vector is utilized.

In another aspect of the image processing apparatus of the present invention, the image signal comprises frame image data, which has a predetermined frame cycle, as a unit, and the movement vector detecting device detects the movement vector on the basis of two consecutive frame image data.

According to this aspect, the object of the image process is the frame image data outputted for each frame cycle, and the above described image process is performed by using the two consecutive frame image data. Therefore, the image process is performed always in a real time manner while the movable body is moving, so that the image processing apparatus dealing with the actual condition of the movable body speedily can be realized.

The above object of the present invention can be also achieved by an image processing method of performing an image process on the basis of an image signal, which is outputted from an image taking device for taking an image in a forward direction of a movable body and outputting the image signal corresponding to the taken image. The image processing method is provided with: a movement vector detecting process of detecting a movement vector for each area of the image taken by the image taking device, on the basis of the image signal while the movable body is moving; and a distance calculating process of setting a standard line at a predetermined image position crossing a road edge with respect to the image taken by the image taking device, and calculating the distance to the road edge on the basis of a distribution of the movement vector on the standard line.

According to the image processing method of the present invention, the image taking operation in the forward direction of the movable body such as a vehicle is performed and the image signal is outputted by the image taking device while the movable body is presently moving. Thus, it is possible to judge the road edge and calculate the distance to the road edge by obtaining the inflection point of the movement vector. Therefore, the calculated distance can be utilized for securing a safety in driving, aiding the navigation operation and the like, so as to improve the safety and the convenience of the movable body by means of a rather simple configuration.

In one aspect of the image processing method of the present invention, the image processing method is further provided with a road width calculating process of calculating a road width of the road, on which the movable body is moving, on the basis of the distance to the road edge calculated by the distance calculating process.

According to this aspect, the road width of the road on which the movable body is presently moving can be calculated on the basis of the distance to the road edge calculated in correspondence with the forward image of the movable body. Therefore, it is possible to secure the safety in driving by using this road width, and store the road width data in correlation with map data, so that the function and safety of the navigation for the movable body can be improved.

In another aspect of the image processing method of the present invention, the image processing method is further provided with a margin degree judging process of judging a degree of margin with respect to the road edge of the road, on which the movable body is moving, on the basis of the distance to the road edge calculated by the distance calculating process.

According to this aspect, on the basis of the distance to the road edge calculated in correspondence with the forward image of the movable body, the margin degree with respect to the road edge of the movable body is judged. Therefore, it is possible to recognize such a condition that the movable body is too close to the road edge and have no margin or clearance, to thereby improve the safety of the movable body.

In another aspect of the image processing method of the present invention, the image processing method is further provided with a calibration process of calibrating an image taking direction of the image taking device on the basis of the detected movement vector.

According to this aspect, the image taking direction of the image taking device is calibrated by detecting the movement vector. Therefore, the image process can be performed in consideration with the scattering of the condition of fixing the image taking device, and a rather simple calibration can be performed since the movement vector is utilized.

In another aspect of the image processing method of the present invention, the image signal comprises frame image data, which has a predetermined frame cycle, as a unit, and the movement vector detecting process detects the movement vector on the basis of two consecutive frame image data.

According to this aspect, the object of the image process is the frame image data outputted for each frame cycle, and the above described image process is performed by using the two consecutive frame image data. Therefore, the image process is performed always in a real time manner while the movable body is moving, so that the image processing method dealing with the actual condition of the movable body speedily can be realized.

The above object of the present invention can be also achieved by a navigation apparatus for performing a route guidance from a present position of a vehicle to a destination on the basis of map data, provided with: a sensor device including a vehicle speed sensor for detecting a moving speed of the vehicle; an image taking device for taking an image in a forward direction of the vehicle and outputting an image signal corresponding to the taken image; a movement vector detecting device for detecting a movement vector for each area of the image taken by the image taking device, on the basis of the image signal while the vehicle is moving; and a distance calculating device for setting a standard line at a predetermined image position crossing a road edge with respect to the image taken by the image taking device, and calculating the distance to the road edge on the basis of the detected moving speed and a distribution of the movement vector on the standard line.

According to the navigation apparatus of the present invention, the vehicle speed is detected by the sensor device, the image taking operation in the forward direction of the vehicle is performed and the image signal is outputted by the image taking device. Then, the movement vector for each area is detected. Thus, it is possible to judge the road edge and calculate the distance to the road edge by obtaining the inflection point of the movement vector. Therefore, the calculated distance can be utilized for securing a safety in driving, aiding the navigation operation and the like, so as to improve the safety and the convenience of the movable body by means of a rather simple configuration.

In one aspect of the navigation apparatus of the present invention, the navigation apparatus is further provided with a warning device for warning that the vehicle is close to the road edge if the calculated distance to the road edge is smaller than a threshold value, which is set in advance.

According to this aspect, on the basis of the distance to the road edge, it is judged that the vehicle is too close to the road edge, and warns it to the driver, so that the safety and the convenience of the vehicle can be further improved.

In another aspect of the navigation apparatus of the present invention, the navigation apparatus is further provided with: a margin degree judging device for judging a degree of margin with respect to the road edge of the road, on which the movable body is moving, on the basis of the distance to the road edge calculated by the distance calculating device; and a warning device for warning that the vehicle is close to the road edge if the judged degree of margin is smaller than a predetermined standard value.

According to this aspect, on the basis of the distance to the road edge calculated in correspondence with the forward image of the movable body, the margin degree with respect to the road edge of the movable body is judged. In accordance with this margin degree, it is warned that the movable body is too close to the road edge, to thereby improve the safety of the movable body.

In another aspect of the navigation apparatus of the present invention, the navigation apparatus is further provided with a road width calculating device for calculating a road width of the road, on which the vehicle is moving, on the basis of the calculated distance to the road edge.

By constituting in this manner, the road width of the road on which the movable body is presently moving can be calculated. For example, the road width can be obtained by adding the distances on the left and right sides. Therefore, it is possible to secure the safety in driving by using this road width, and store the road width data in correlation with the map data, so that the function and safety of the navigation for the vehicle can be improved.

In this aspect having the road width calculating device, the navigation apparatus may be further provided with a road width data memory for storing road width data corresponding to the calculated road width in correlation with the map data such that the road width data can be updated.

By constituting in this manner, the road width data corresponding to the calculated road width is stored into the map data memory such that it can be updated. Therefore, since the road width data of the road on which the vehicle has moved can be held, and can be utilized later on when the vehicle moves on the same road again, it is possible to aid the function of the navigation apparatus.

In this aspect having the road width calculating device, the navigation apparatus is further provided with: a traffic lane judging device for judging a traffic lane, on which the vehicle is presently moving, on the basis of calculation results of the distance calculating device and the road width calculating device; and a warning device for warning an appropriate traffic lane, on which the vehicle is to move, by correlating the judged traffic lane with a route to the destination.

By constituting in this manner, when the vehicle moves on a road having a plurality of traffic lanes, the traffic lane, on which the vehicle is presently moving, is judged by the traffic lane judging device, on the basis of the distance to the road edge and the road width. Then, the judged traffic lane is correlated with the optimum route to the destination, and the warning is given to the driver so as to drive the vehicle on the appropriate traffic lane corresponding to the optimum route. Therefore, it is possible to caution the driver to drive the vehicle on the traffic lane corresponding to the optimum route, so that the comfortable navigation apparatus can be realized.

In this aspect having the traffic lane judging device, the warning device may warn the appropriate traffic lane if the judged traffic lane is not coincident with the appropriate traffic lane.

By constituting in this manner, the judged traffic lane is correlated with the optimum route to the destination, and the appropriate traffic lane is warned to the driver when it is judged that the vehicle is not moving on the appropriate traffic lane. Therefore, while unnecessary warning is avoided when the vehicle is moving on the appropriate lane, the comfortable navigation apparatus can be realized by virtue of minimal warning.

In this aspect having the traffic lane judging device, the warning device may warn that the judged traffic lane is coincident with the appropriate traffic lane if the judged traffic lane is coincident with the appropriate traffic lane.

By constituting in this manner, the judged traffic lane is correlated with the optimum route to the destination, and, if it is judged that the vehicle is moving on the appropriate traffic lane, this fact is warned to the driver. Therefore, by informing the drive that the vehicle is moving on the appropriate traffic lane, the comfortable navigation apparatus giving the safety feeling to the driver can be realized.

A program storage device readable by a computer, tangibly embodying a program of instructions executable by the computer to perform an image process on the basis of an image signal, which is outputted from an image taking device for taking an image in a forward direction of a movable body and outputting the image signal corresponding to the taken image. The image process includes: a movement vector detecting process of detecting a movement vector for each area of the image taken by the image taking device, on the basis of the image signal while the movable body is moving; and a distance calculating process of setting a standard line at a predetermined image position crossing a road edge with respect to the image taken by the image taking device, and calculating the distance to the road edge on the basis of a distribution of the movement vector on the standard line.

According to the program storage device of the present invention, as the computer reads in and executes the program stored therein, it is possible to realize the above described image processing apparatus of the present invention on the computer.

The above object of the present invention can be also achieved by a computer data signal embodied in a carrier wave and representing a series of instructions which cause a computer to perform an image process on the basis of an image signal, which is outputted from an image taking device for taking an image in a forward direction of a movable body and outputting the image signal corresponding to the taken image. The image process includes: a movement vector detecting process of detecting a movement vector for each area of the image taken by the image taking device, on the basis of the image signal while the movable body is moving; and a distance calculating process of setting a standard line at a predetermined image position crossing a road edge with respect to the image taken by the image taking device, and calculating the distance to the road edge on the basis of a distribution of the movement vector on the standard line.

According to the computer data signal embodied in the carrier wave of the present invention, as the computer downloads and executes the program in the computer data signal, it is possible to realize the above described image processing apparatus of the present invention on the computer.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 1 is a block diagram showing a schematic construction of a navigation apparatus as an embodiment of the present invention;

FIG. 2 is a block diagram showing a construction of an image processing unit of the navigation system of FIG. 1;

FIG. 4 is a diagram showing an image taken by the CCD camera in the embodiment by means of a model of a pinhole camera;

FIG. 7 is a diagram for explaining a method of obtaining the movement vector by defining a comparison block within a search range, with respect to the reference block within the image plane in the embodiment;

FIG. 8 is a diagram showing an example of the image taken by the CCD camera in then image process in the embodiment;

FIG. 10 is a flow chart showing a method of calculating the distance to a wall surface of left and right road edges from the vehicle on the basis of the movement vector in the embodiment;

DETAILED DESCRIPTION OF THE PREFERRED EMBODIMENTS

Figure 3A:
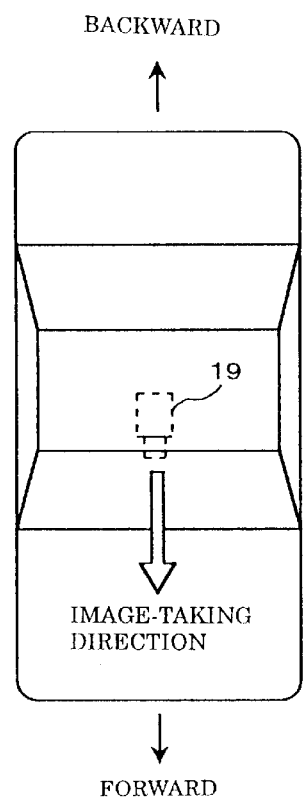
FIG. 3A is a diagrammatic plan view of a vehicle showing a condition of setting a CCD camera to the vehicle in the embodiment.

Referring to the accompanying drawings, an embodiment of the present invention will be now explained.

In FIG. 1, a navigation apparatus as an embodiment of the present invention is provided with a controller 11, a map data memory 12, a road width data memory 13, a sensor unit 14, a present position detecting unit 15, a display unit 16, a speaker 17, an image processing unit 18, and a CCD camera 19.

In the above mentioned construction, the controller 11 controls an operation of the navigation apparatus on the whole. The controller 11 is constructed by a CPU or the like. The controller reads and executes a control program stored in a ROM not-illustrated, transmits a control signal to each constitutional element of the navigation apparatus, and inputs and outputs various data.

The map data memory 12 is a large capacity memory, for storing the map data, and is constituted by a CD-ROM or a DVD-ROM for example. The map data stored in the map data memory 12 include road shape data, name data, background data and so on.

The road data memory 13 is a memory for storing the road width data, which is obtained by an image process of the present invention described layer in detail, of a road where the vehicle is presently traveling, such that the stored road width data can be updated. Rough road width data may be included in the map data stored in the map data memory 12. The road width data stored in the road width data memory 13 is more detail than this rough road width data, and is data in which the road width which changes depending upon the position of the road is accurately obtained. The method of generating the road width data will be described later in detail.

The sensor unit 14 includes various sensors required for detecting the present position of the vehicle. More concretely, the sensor unit 14 includes a vehicle speed sensor for detecting a speed of the vehicle, an azimuth sensor for detecting an azimuth changing amount of the vehicle, a GPS (Global Positioning System) receiver for receiving electric waves from GPS satellites and so on.

The present position detecting unit 15 calculates a present position of the vehicle on the basis of output signals from the sensor unit 14, and outputs the present position data. Incidentally, the present position data is correlated with the aforementioned map data by the controller 11 to be corrected by means of a map matching technique or the like.

On the display unit 16, the map data is displayed in various aspects under the control of the controller 11, and the present position of the vehicle is superimposed and displayed on this map data as a car mark. The display unit 16 may be constructed by a CRT (Cathode Ray Tube), an LCD (Liquid Crystal Device) or the like. From the speaker 17, guidance information along the route of the vehicle is voice-outputted, and the later described guidance information is voice-outputted in association with the image process of the present invention.

The image processing unit 18 analyzes the image signal from the CCD camera 19, which is installed in the vehicle, to perform the image process of the present invention. Here, the construction and the operation of the image processing unit 18 are explained with reference to FIG. 2.

As shown in FIG. 2, the image processing unit 18 is provided with an A/D convertor 21, a $1^{st}$ image memory 22, a $2^{nd}$ image memory 23, a movement vector detecting unit 24, and a movement vector processing unit 25. The image processing unit 18 is operated in accordance with the control signal from the controller 11.

In FIG. 2, the A/D convertor 21 converts an analog image signal based on an image taken by the CCD 19 to a digital image signal. Normally, the digital image signal outputted from the A/D convertor 21 constitutes one frame image data for each predetermined frame cycle. In other word, the digital image signal comprises a continuous plurality of frame image data.

The $1^{st}$ image memory 22 and the $2^{nd}$ image memory 23 store the frame image data outputted from the A/D convertor 21 respectively. The $1^{st}$ image memory 22 stores the current frame image data, while the $2^{nd}$ image memory 23 stores the one previous frame image data. Therefore, the image data in two-frames-amount is always held in the image processing unit 18 by those two memories, and is used to perform the later described process.

The movement vector detecting unit 24 detects a movement vector for each area within the image, on the basis of the frame image data stored in the $1^{st}$ image memory 22 and the $2^{nd}$ image memory 23. At this time of detection, the vehicle speed data outputted from the sensor unit 14 is also used.

The movement vector processing unit 25 obtains a horizontal distance to a road edge such as a wall surface etc., on a forward side of a road where the vehicle is presently traveling and further obtains the road width based on this horizontal distance to the road edge, on the basis of the movement vector detected by the movement vector detecting unit 24, and outputs them as distance data and/or road width data.

Incidentally, the detailed processes in the movement vector detecting unit 24 and the movement vector processing unit 25 will be described later.

In FIG. 1 again, the CCD camera 19 is installed at a predetermined position of the vehicle to take the image in the forward direction of the vehicle and output the image signal. Here, the condition of setting the CCD camera 19 is shown in FIGS. 3A and 3B.

FIG. 3A is a diagram showing the condition of setting the CCD camera 19 seen from an upward direction of the vehicle. As shown in FIG. 3A, the CCD camera 19 is installed to an upper portion in the vehicle cabin at the vicinity of its center. The CCD camera 19 is set and fixed at a position where the CCD can take the image with facing in the forward direction of the vehicle.

Figure 3B:
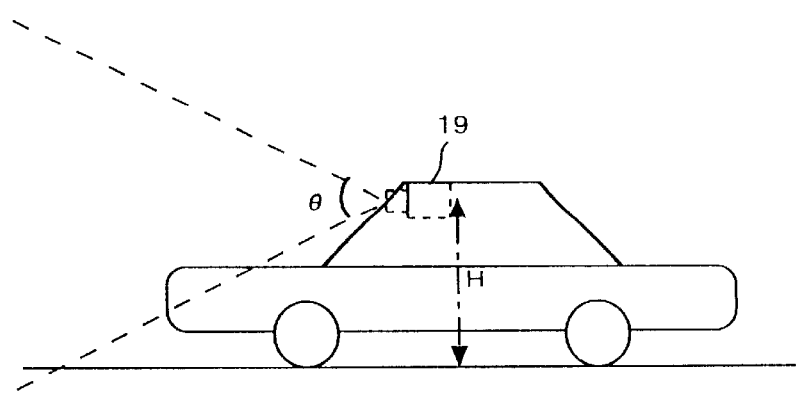
FIG. 3B is a diagrammatic side view of the vehicle showing the condition of setting the CCD camera to the vehicle in the embodiment.

FIG. 3B is a diagram showing the condition of setting the CCD camera 19 seen from a forward direction of the vehicle together with the range to be image-taken by the CCD camera 19. As shown in FIG. 3B, the CCD camera 19 is adapted to image-take the range in an image angle θ (i.e., an angular field of view) in the forward direction of the vehicle. The CCD 19 is installed such that the center of the taken-image is coincident with the horizontal direction with respect to the road surface. The CCD camera 19 is installed to a position at a height of H from the road surface. For example, the height H is about 1.5 [m].

In FIG. 1 again, the navigation apparatus is further provided with a reading unit 101 and a communication unit 103.

The later described navigating operations including the image process on the navigation apparatus are executed mainly by the controller 11 and the image processing unit 18, after the reading unit 101 installs a computer program stored in a record medium 102 such as, for example, a CD-ROM, a DVD-ROM and the like, into the navigation apparatus. Alternatively, such a computer program may be downloaded to the navigation apparatus by the communication unit 103 through a network such as an internet. Such a computer program may be stored in the same memory as the map data memory 12 and/or the road width data memory 13.

Next, the principle of the image process of the present invention is explained with reference to FIG. 4 to FIG. 9.

FIG. 4 is a diagram showing the image taken by the above mentioned CCD camera 19 by using a model of a pinhole camera. In FIG. 4, an image plane P0 corresponding to the light receiving element portion of the CCD camera 19 and a focal plane F corresponding to a lens portion of the CCD camera 19 are disposed in parallel to each other with an interval of focal distance f. A lens center C of the focal plane F corresponds to a pinhole. A space coordinate system (X,Y,Z) is set with this lens center C as a coordinate center. On the other hand, on the image plane P0, a camera coordinate system (x, y) is set with a space coordinate (0, 0, −f) as an image center c.

Here, a point M (Xm, Ym, Zm) on the space coordinate system is considered. The point M may correspond to a predetermined position on a wall surface or a road surface within a field of view shown in FIG. 3B, for example. A central projection corresponding to this point M is projected to a point m (xm, ym) on the camera coordinate system by a straight line connected from the point M to the image plane P0 through the lens center C on the focal plane F.

At this time, the relationship between the point M (Xm, Ym, Zm) and the projection point m (xm, ym) is expressed by following equations (1).

$$xm = f \times Xm/Zm$$

$$ym = f \times Ym/Zm \quad (1)$$

Figure 5:
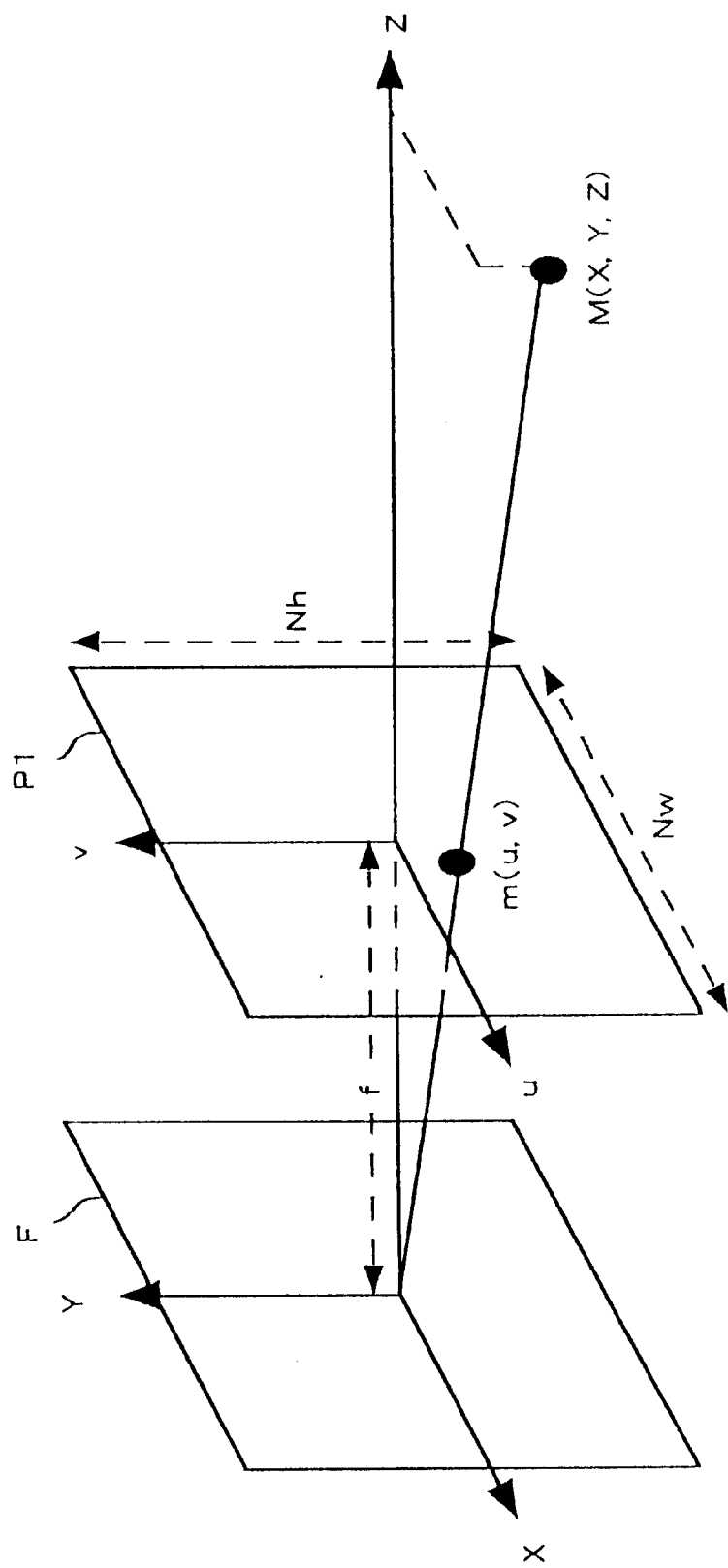
FIG. 5 is a diagram showing a relationship between a space coordinate system and a pixel coordinate system of image data in the embodiment.

Next, FIG. 5 is a diagram showing the relationship between the space coordinate system (X, Y, Z) and a pixel coordinate system (u, v) of the image data, in correspondence with FIG. 4. In FIG. 5, for the sake of simplicity, the pixel coordinate system (u, v) is set by positioning the image plane P0 of FIG. 4 on a forward side of the focal plane F and, by inverting the x axis and y axis on the camera coordinate system (x, y) to the u axis and v axis respectively. Even if the arrangement of FIG. 4 is replaced by the arrangement of FIG. 5, since those arrangements are equivalent to each other, the same relationships are validated.

In FIG. 5, the image plane P1 on the pixel coordinate system corresponds to the display image in which the number of pixels is Nw in the horizontal direction and the number of pixels is Nh in a vertical direction, so that the Nw×Nh pixels are included on the pixel plane P1 in total. On the other hand, the image plane P1 coincides with the light receiving area of the CCD camera 19 in which the lateral width is w and the height is h. If the point M (X, Y, Z) on the space coordinate system is considered in the same manner as FIG. 4, it is connected by a straight line passing through the point m (u, v) on the image plane P1 to the lens center C on the focal plane F as shown in FIG. 5.

Here, if the central projection with respect to the point m is considered in the same manner as FIG. 4, the relationship between the point M (X, Y, Z) and the projection point m (u, v) is expressed by following equations (2) in correspondence with the aforementioned equations (1).

$$u = (f \times X/Z) \times Nw/w$$

$$v = (f \times Y/Z) \times Nh/h \quad (2)$$

Namely, the equations (2) express the pixel position of the point m (u, v) on the image plane P1. In the equations (2), u corresponds to the pixel position in the horizontal direction, while u corresponds to the pixel position in the vertical direction.

In the present embodiment, since the image taken from the vehicle which is presently traveling is processed, the movement of an object within the image plane P1 is considered. Thus, an optical flow on the image plane P1 i.e., a movement vector V (u, v) is to be obtained. Assuming that a light intensity I at the same point in the 3 dimensional space is kept constant, a next time-space differential equation (3) is validated.

$$dI/dt = Ix \times u + Iy \times v + It = 0 \qquad (3)$$

In this equation (3), within the image plane P1 respectively, Ix represents a partial differential in the horizontal direction, Iy is a partial differential in the vertical direction, It is a partial differential in the time axis direction, u is a component of the aforementioned movement vector V in the horizontal direction, and v is a component of the aforementioned movement vector V in the vertical direction.

Next, the method of obtaining the movement vector V is explained with reference to FIG. 6 and FIG. 7.

Figure 6:
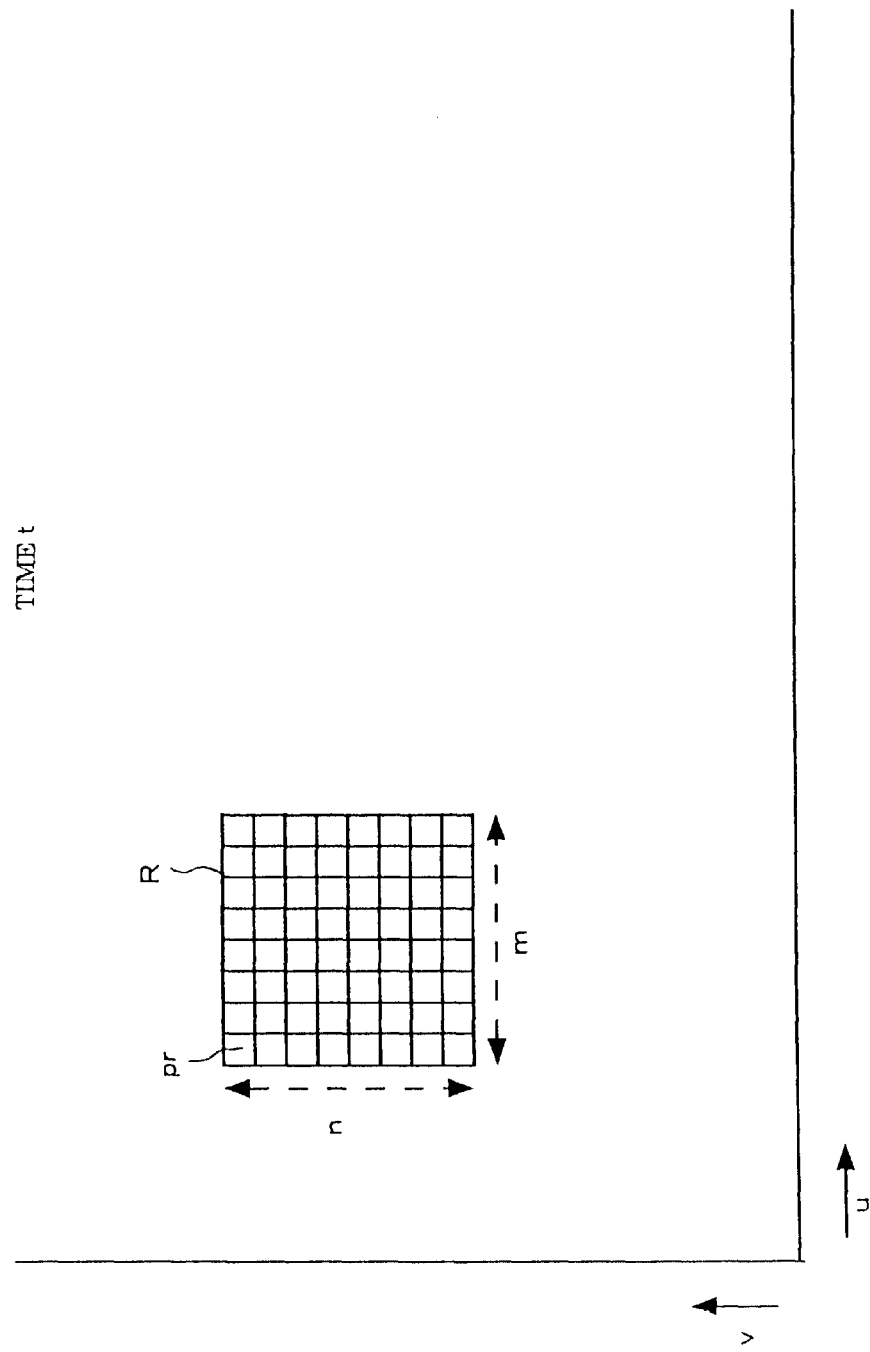
FIG. 6 is a diagram for explaining a reference block defined within an image plane when obtaining a movement vector in the embodiment.

A reference block R is defined within the image plane P1 at the time t as shown in FIG. 6. This reference block R is a rectangular shaped area within a range of m pixels along the u axis and n pixels along the v axis with the pixel pr at the left upper corner thereof as a starting point, and includes m×n pixels in total. Then, the image plane P1 is divided into a plurality of reference blocks R, and the movement vector V is obtained for each reference block R. In the example of FIG. 6, the reference block R in which m=8 and n=8 is indicated.

FIG. 7 is a diagram for explaining the method of obtaining the movement vector V for the reference block R within the image plane P1. FIG. 7 corresponds to the image plane P1 at the time t+Δt when the time duration Δt has elapsed from the time t of FIG. 6. On the basis of the vehicle speed data etc., from the sensor unit 14, a predetermined area within the image plane P1 is defined as a search range S in advance. The search range S is a rectangular shaped area having M pixels along the u axis and N pixels along the v axis, in which the values of M and N are larger than the values of m and n respectively.

With respect to the search range S, a comparison block C having the same size as the reference block R is defined at a predetermined position. Since the size of the search range S is significantly larger than that of the reference block R, the position of the comparison block C is gradually moved within the search range S little by little. In FIG. 7, the comparison block C has the m=n size same as the reference block R, and indicates the pixel pc at the left upper corner of the comparison block C corresponding to the pixel pr at the left upper corner of the reference block R. At first, the pixel of at the left upper corner of the search range S is set as the pixel pc of the comparison block C, and after that, the position of the pixel pc is moved one pixel by one pixel in the u axis direction or the v axis direction within the search range S, so that the later described calculation is performed for all the reference blocks C which can be defined within the search range S.

Subsequently, the correlation value between the reference block R at the time t in FIG. 6 and the comparison block C at the time t+Δt in FIG. 7 is obtained. Here, since, in the image data which is a set of pixels, the density value is made correspondent with each of the m×n pixels, the difference in the density values is obtained for each corresponding pixels of the comparison block C and the reference block R. By calculating a sum of the differences in the density values of the respective m×n pixels, the correlation value can be calculated.

Then, the correlation value between the reference block R and the comparison block C is obtained for all the comparison blocks C within the search range S, and the comparison block C, which gives the minimum correlation value, is searched. For example, it is assumed here that the comparison block C shown in FIG. 7 gives the minimum correlation value.

In this case, as shown in FIG. 7, it is possible to determine a vector, which is directed toward the comparison block C at the time t+Δt from the reference block R at the time t indicated by a dashed line in the image plane P1, as the movement vector.

In FIG. 7, although only one movement vector V is illustrated, the movement vector V is actually obtained for all the reference blocks R which can be defined within the image plane P1. By this, the spatial distribution of the movement vectors V is obtained. The, on the basis of the spatial distribution of the movement vectors V, the later described process is performed.

Next, the method of obtaining the movement vector of the image taken from the presently traveling vehicle and also the method of calculating the distance from the vehicle to the road edge as well as the road width of a road where the vehicle is presently traveling will be explained with reference to FIG. 8 and FIG. 9.

FIG. 8 is a diagram showing one example of the image taken by the CCD camera 19. In FIG. 8, for the sake of simplicity, the image is shown in which there is a wall surface having a constant height and located at both road edges of a straight road having a constant width, and in which the vehicle is traveling on a left side of a center line by a predetermined distance from the center line. The road surface contacts with the wall surface on the left side at a boundary line BL and contacts with the wall surface of the right side at a boundary line BR.

As shown in FIG. 8, the center of the image is made correspondent with an original point (0, 0) of the pixel image coordinate system (u, v). Namely, an image taking direction of the image is parallel to the road surface and the wall surface, and disappearance point, where the boundary line BL, the boundary Line BR and so on meet with each other, coincides with the original point (0, 0). The whole image occupies a rectangular shaped area, which has four vertexes of pixels i.e., a left upper corner point (−Nw/2, Nh/2), a right upper corner point (Nw/2, Nh/2), a left lower corner point (−Nw/2, −Nh/2) and a right lower corner point (Nw/2, −Nh/2). When executing the later described image process, it is necessary to precisely calibrate the image taking direction and the height H of installation of the CCD camera 19 in advance. Even if the original point (0, 0) and the disappearance point are not coincident with each other, as long as the position of the disappearance point can be specified by the calibration, the image process of the present invention can be performed.

In FIG. 8, a standard horizontal line L expressed by v=VR is set in the image. The standard horizontal line L is to be set at a position which transverses the road surface and the wall surfaces on the left and right sides i.e., a position which crosses the road edges, so that the value VR becomes a negative value. For example, the standard horizontal line L may be set at the image position corresponding to the relative position on the road surface forward from the vehicle by 10 meters. In FIG. 8, the movement vector V on the standard horizontal line L between the time t and the time t+Δt is obtained. As the vehicle advances forward for a certain distance until the time duration Δt has been elapsed, the image taken object on the standard horizontal line L approaches the vehicle correspondingly, so that the v component of the movement vector V on the standard horizontal line L becomes a negative value.

The relative position to the vehicle at which the standard horizontal line L is to be set may be an appropriate distance other than 10 meters. If the relative position is too close to the vehicle, it is not appropriate since the standard horizontal line L does not transverse the wall surface of the left and right sides. If the relative position is too far from the vehicle, although the standard horizontal line L transverses the road surface as well as the wall surfaces on the left and right sides, an error may be generated due to the change in the shape of the road such as a curve or the like. For this reason, it is preferable to set the standard horizontal line L at the relative position, which is as close as possible to the vehicle in the range that the standard horizontal line L sufficiently overlaps the road surface and the wall surfaces.

Here, it is assumed that the image is taken by the CCD camera 19 at a frame cycle T [sec] in the vehicle, which is traveling at a speed of v0 [m/sec]. In this case, the movement distance d of the vehicle during one frame is expressed by a following equation (4).

$$d = v0 \times T [m] \quad (4)$$

On the other hand, the movement vector V on the standard horizontal line L becomes a vector directed radially from the original point (0, 0), which coincides with the disappearance point, in accompaniment with the movement of the vehicle. The magnitude of the movement vector V changes such that it increases the more as the distance between the vehicle and the image taken object on the standard horizontal line L is the shorter.

At this time, the distribution of the movement vector V on the standard horizontal line L changes in different patterns between the road surface and the wall surfaces of the left and right sides. Thus, by analyzing the pattern change of the movement vector V, the positions of the crossing points between the standard horizontal line L and the boundary lines BL and BR are obtained respectively. On the basis of these obtained positions of the crossing points, the distances DL and DR to the road edges on the left and right sides from the position of the vehicle are respectively calculated, and the road width RW of the road where the vehicle is presently traveling is further calculated.

Here, the relationship between the actual spatial coordinate system (X, Y, Z) and the pixel image coordinate system (u, v) on the standard horizontal line L in FIG. 8 is explained with reference to FIG. 9A to FIG. 9C. The depth Z of the image taken object is expressed by a following equation (5) on the basis of the equation (2).

$$Z = X \times f \times Nw / (u \times w) \quad (5)$$

Figure 9A:
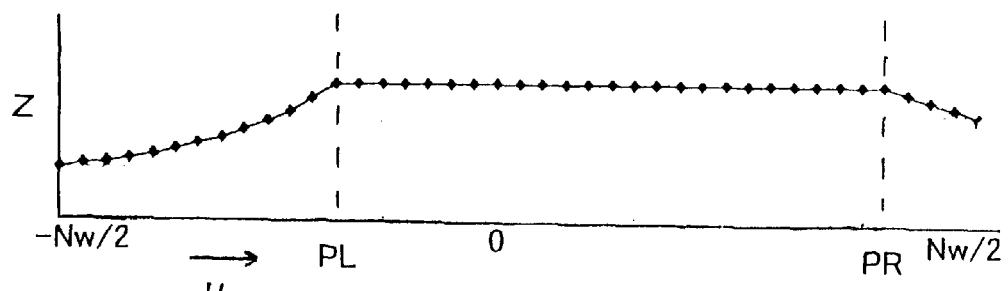
FIGS. 9(A), (B), and (C) are diagrams for explaining a relationship between the space coordinate system and the pixel coordinate system at the standard horizontal line within the image in the embodiment.

FIG. 9A is a graph showing the change of the depth Z seen from the image taking position with respect to each value u on the horizontal axis of the image. In FIG. 9A, an inflection point PL corresponds to the crossing point of the standard horizontal line L and the boundary line BL, while an inflection point PR corresponds to the crossing point of the standard horizontal line L and the boundary line BR. As shown in FIG. 9A, the depth Z is constant in case of the road surface, while the depth Z reduces toward the outside in case of the wall surface. Namely, as understood from the equation (5), since the standard horizontal line L is on the horizontal surface in case of the road surface, u is proportional to X while Z is constant. On the other hand, since the standard horizontal line L is on the vertical surface in case of the wall surfaces on the left and right sides, X is constant while Z changes in inverse-proportional to u.

Next, the height Y of the standard horizontal line L of FIG. 8 is expressed by a following equation (6) on the basis of equations (2) and (5).

$$Y = Z \times v \times h / (f \times Nh) \quad (6)$$

Figure 9B:
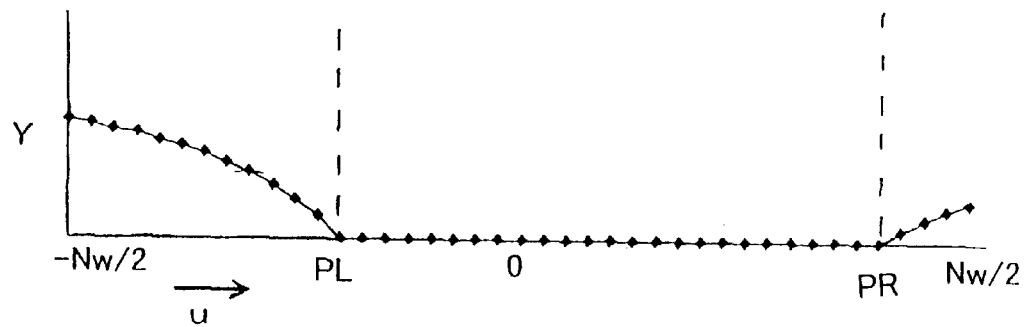

FIG. 9B is a graph showing the change of the height Y with respect to each value u on the horizontal axis of the image. In FIG. 9B, Y is constant between the inflection point PL and the inflection point PR in case of the road surface in the same manner as FIG. 9A. On the other hand, Y increases toward the outside in case of the wall surfaces. This is reverse to the case of FIG. 9A, since the value u becomes negative in the equation (6).

Next, assuming that the vehicle advances for $\Delta Z$ [m] from the condition shown in FIG. 8, if the vertical position of the standard horizontal line L shown in FIG. 8 moves $\Delta v$ (pixel), the relationship between $\Delta v$ and $\Delta Z$ is expressed by a following equation (7).

$$\Delta v = Y \times f \times Nh / ((Z - \Delta Z) \times h) - Y \times f \times Nh / (Z \times h) \quad (7)$$

Figure 9C:
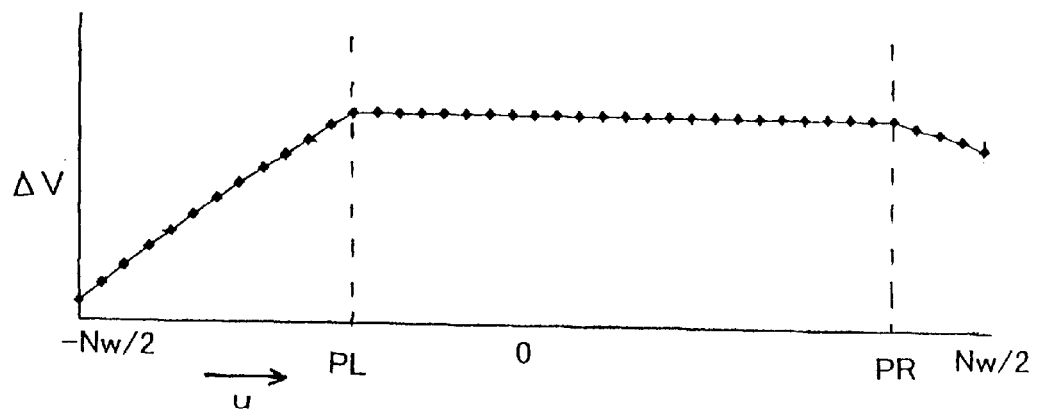

FIG. 9C is a graph showing the change of $\Delta v$ when the vehicle advances for $\Delta Z$ [m] with respect to each value u on the horizontal axis of the image. In FIG. 9C, $\Delta v$ is constant in case of the road surface between the inflection point PL and the inflection point PR in the same manner as FIG. 9A and FIG. 9B. On the other hand, in case of the wall surfaces, $\Delta v$ decreases toward the outside. Therefore, the later described calculation is performed on the basis of the value of $\Delta v$ indicated by the equation (7).

Incidentally, although the case has been explained in which the wall surface exists on the whole road edges, it is possible to calculate the distances DL and DR and the road width RW even if there exists only partially the wall surface such as a guardrail, as long as the movement vector V changes between the road surface and the portion other than that.

FIG. 10 is a flow chart showing the method of calculating the distances DL and DR to the wall surfaces at the road edges on the left and right sides of the vehicle etc., by evaluating the movement vector V on the basis of the equation (7). Before performing the processes explained below, the image taking direction and the height H of installation of the CCD camera 19 are calibrated in advance.

In FIG. 10, the movement vector V on the standard horizontal line L is calculated as mentioned above (step S1). Namely, by comparing the images of two consecutive frame image data with each other, the movement vector V on the standard horizontal line L during the frame cycle T is calculated.

Then, by evaluating the v component of the movement vector V, the inflection point PL on the left side and the inflection point PR on the right side on the standard horizontal line L are extracted on the basis of the equation 7 (step S2). At this time, the position ul in the u direction of the inflection point PL and the position ur in the u direction of the inflection point PR are obtained.

Then, the positions ul and ur in the u direction of the extracted inflection points PL and PR respectively are converted to the positions in the X direction in the spatial coordinate system (step S3). More concretely, the value X is calculated by a following equation (8) based on the equations (2).

$$X = u \times Z \times w / (Nw \times f)$$

wherein $$Z = -H \times f \times Nh/(v \times h) \quad (8)$$

The value X expressed by the equation (8) is calculated for each of the inflection points PL and PR on the left and right sides.

Then, the distance DL to the wall surface on the left side, the distance DR to the wall surface on the right side and the road width RW are obtained (step S4). Namely, on the basis of the calculation result, the position in the X direction of the inflection point PL on the left side is made correspondent with the distance DL, while the position in the X direction of the inflection point PR on the right side is made correspondent with the distance DR, at the step S4. The road width RW can be calculated by adding those distances DL and DR as a following equation (9).

$$RW = DL + DR \quad (9)$$

The position of the vehicle on the road can be identified on the basis of the relative relationship between these distances DL and DR.

The margin degree ML of the wall surface on the left side and the margin degree MR of the wall surface on the right side are obtained by following equations (10), under an assumption that the camera is installed to a center of the vehicle in the horizontal direction.

$$ML = DL - W/2$$

$$MR = DR - W/2 \quad (10)$$

wherein W represents a lateral width of the vehicle.

The margin degrees ML and MR on the left and right sides expressed by the equation (10) become the judgment criteria when the navigation apparatus gives warning to the driver as described later.

The processes in the steps S1 to S5 are performed by evaluating the v component of the movement vector V. Instead, since the characteristic of the u component of the movement vector V also changes between the inflection points PL and PR in the similar manner, it is possible to perform the above described processes by evaluating the u component of the movement vector V.

In addition, by storing the road width data corresponding to the calculated road width RW into the road width data memory 13 in correlation with the map data such that the road width data can be updated, the road width data can be utilized in the various processes described later.

Further, as concrete examples of the various numerical values in the above described image process, the focal distance f=4 [mm], the number of pixels in the horizontal direction Nw=320 [pixels], the lateral width of the light receiving area w=4 [mm], and the frame cycle T=1/30 [sec].

Figure 11:
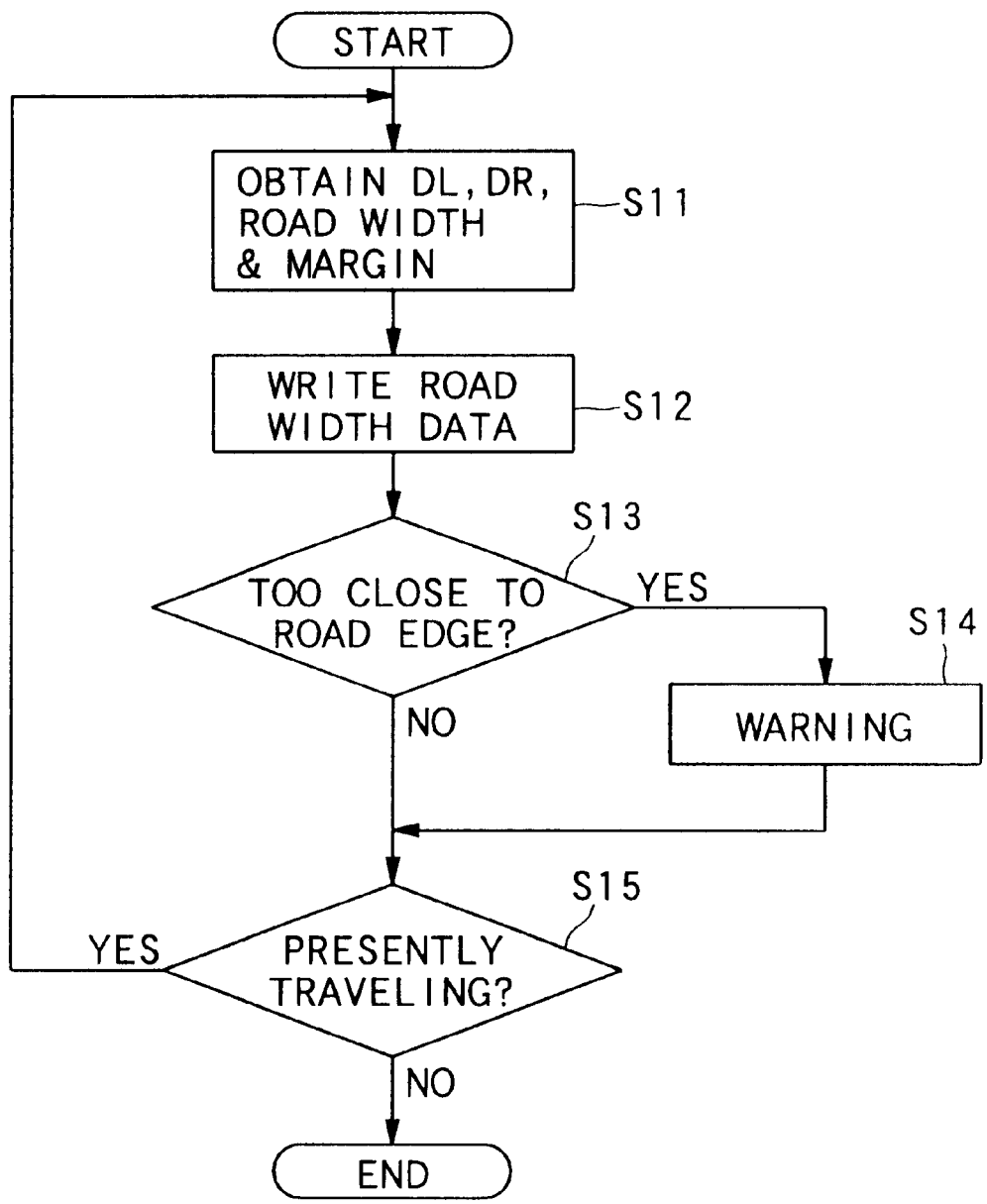
FIG. 11 is a flow chart showing a process of preventing a presently traveling vehicle is positioned too close to the road edge, in correspondence with a road width detection in the navigation apparatus of the embodiment.
Figure 12:
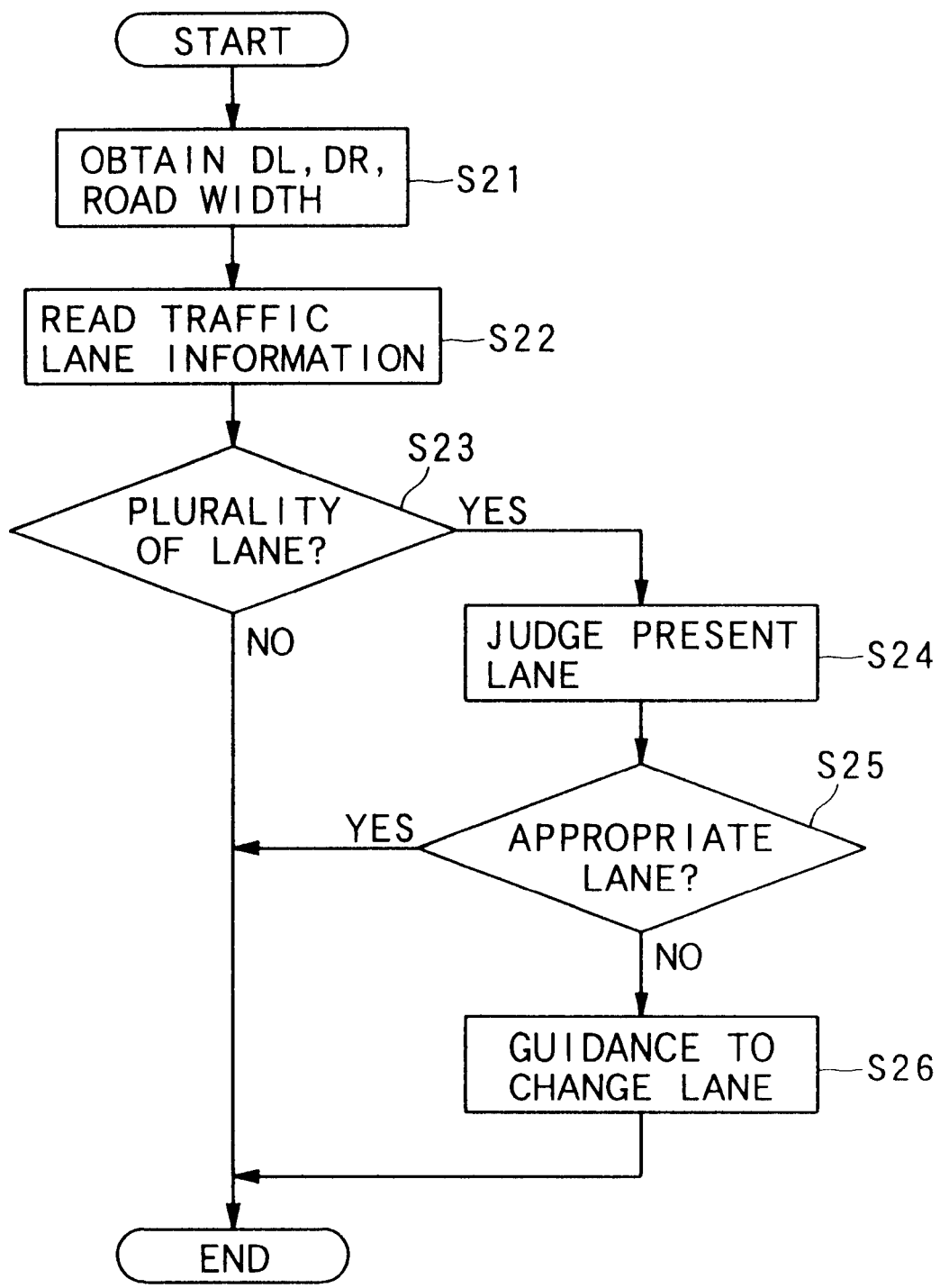
FIG. 12 is a flow chart showing a process of allowing the vehicle to travel on an appropriate traffic lane for a set route when the vehicle is presently traveling on a road having a plurality of traffic lanes, in correspondence with a road width detection in the navigation apparatus of the embodiment.

Next, the actual image processes in the navigation apparatus of the present embodiment are explained with reference to FIG. 11 and FIG. 12. FIG. 11 is a flow chart showing the process of preventing the presently traveling vehicle from approaching too close to the road edge. FIG. 12 is a flow chart showing the process of allowing the vehicle to travel on an appropriate traffic lane for a set route when the vehicle is presently traveling on a road having a plurality of traffic lanes. The processes shown in FIG. 11 and FIG. 12 are performed mainly under the control of the controller 11.

In FIG. 11, when the process is started, the distances DL and DR to the road edges on both sides are obtained by the above described process of the image processing unit 18, the road width RW is calculated according to the equation (9) on the basis of those distances DL and DR, and further the margin degrees ML and MR with respect to the wall surface on the left and right sides are calculated according to the equation (10) (step S11). Then, the road width data corresponding to the road width RW calculated by the step S11 is written into the road width data memory 13 in correlation with the map data (step S12). At this time, it may be performed to write the road width data at each point on the road set in advance.

Then, on the basis of the margin degrees ML and MR calculated by the step S11, it is judged whether or not the presently traveling vehicle is too close to the road edge (step S13). Namely, it may be judged that the vehicle is too close to the road edge if the margin degree ML or MR is smaller than a predetermined value, which is set in advance as a standard value.

If the judgment result is "YES" in the step S13, it is warned to the driver that the vehicle is too close to the road edge (step S14). For example, a predetermined message indicating that the vehicle is too close to the road edge is voice-outputted from the speaker 17. Alternatively, such a message, a predetermined display mark or the like may be displayed on the display unit 16.

If the judgment result in the step S13 is "NO" or after completing the process at the step S14, it is judged whether or not the vehicle is presently traveling (step S15). If the vehicle is not presently traveling (step S15: NO), since it is not necessary to perform the image process, the processes are ended. On the other hand, if the vehicle is still presently traveling (step S15: YES), the operation flow returns to the step S11, so as to repeat the processes S1 to S5.

By performing the above described processes of the steps S11 to S15 in the navigation apparatus, it is possible to always obtain the accurate road width RW in a real time manner. Then, by monitoring the distances DL and DR to the road edge, when the presently traveling vehicle is too close to the road edge, the warning is executed for the driver. Thus, it is possible to secure the safety during the driving operation by aiding the driving operation for the driver. Further, since the road width data is appropriately written into the road width data memory 13, it is possible to efficiently use the road width data in case that the vehicle travels on the same road later on.

Next, the process shown in FIG. 12 is performed under a condition that a desirable destination is set to the navigation apparatus and a route to the destination is judged. At first, in the same manner as the step S11, the distances DL and DR to the road edge on both sides are obtained, and the road width RW is further calculated (step S21).

Then, traffic lane information as for traffic lanes where the vehicle is presently driving, which is included in the map data is read out from the map data memory 12 (step S22). The traffic lane information indicates how many traffic lanes are there on the road where the vehicle is presently traveling. Thus, it is judged whether or not the road where the vehicle is presently traveling is a road having a plurality of traffic lanes on the basis of the traffic lane information (step S23).

If the judgment result in the step S23 is "YES", it is judged on which traffic lane the vehicle is presently traveling on the basis of the judgment result in the step S21 (step S24). This judgment can be performed on the basis of the ratio of the distances DL and DR to the road edge on both sides of the vehicle, which are obtained by the step S21.

Next, it is judged whether or not the lane judged by the step S24 is the appropriate lane corresponding to the route to the destination (step S25). Namely, in case that the vehicle is traveling on a road having three traffic lanes, if the vehicle is to turn to the right at a forward point, the right lane is generally the appropriate lane, if the vehicle is to turn to the left at the forward point, the left lane is generally the appropriate lane, or if the vehicle is to travel straight as it is at the forward point, any lane may be the appropriate lane depending on the actual occasion. Alternatively, information indicative of the appropriate lane for the left turn or the right turn may be set in advance.

As a result of the judgment in the step S25, if the vehicle is presently traveling on the appropriate lane (step S25: YES), the processes are ended. On the other hand, if the vehicle is not presently traveling on the appropriate lane (step S25: NO), a guidance to change the lane is instructed to the driver (step S26). For example, in case that the vehicle is presently traveling on the left lane before a right turning point, a message to recommend the driver to move the vehicle rightward by two lanes may be voice-outputted from the speaker 17 or may be displayed on the display unit 16.

By performing the processes in the steps S21 to S26 in the navigation apparatus, it is possible to judge the traffic lane where the vehicle is to travel, on a road having a plurality of traffic lanes in a real time manner. Then, just in case that the vehicle is not traveling on the appropriate traffic lane for the right turn or the left turn, the guidance to change the traffic lane is instructed to the driver. Thus, the guidance is instructed only in case of necessity, and unnecessary guidance is avoided in case that the vehicle is traveling on the appropriate traffic lane. Therefore, it is possible to realize a more convenient and comfortable navigation for the driver.

Incidentally, in the example shown in FIG. 12, the case that the guidance to change the traffic lane is instructed only when the vehicle is not traveling on the appropriate traffic lane, i.e., the case that the guidance to change the traffic lane is not instructed when the vehicle is traveling on the appropriate traffic lane has been explained. However, the invention is not limited to this. It is possible to make guidance in some kind when the vehicle is traveling on the appropriate traffic lane. For example, a guidance of "Please keep your lane as it is" may be voice-outputted. By this, it is possible to give a sense of safety to the driver by allowing the driver to recognize that the vehicle is traveling on the appropriate traffic lane.

Here, the method of calibrating the CCD camera 19 is explained. As mentioned above, in order to perform the image process with a high accuracy, it is required to perform the calibration of the CCD camera 19. Especially, if the image taking direction of the CCD camera 19 is drifted, the road width RW etc., cannot be accurately obtained. Therefore, the calibration is performed by measuring the image taking direction and the height of installation of the CCD camera 19 when installing the CCD camera 19, and setting the measured values in the navigation apparatus. Alternatively, not only when installing the CCD camera 19, the calibration may be performed on the basis of the image while the CCD camera 19 is used to take the image. In this case, various parameters to be calibrated are obtained statistically.

It is also possible to use the movement vector V in the image taken by the CCD camera 19 for the calibration of the image taking direction. Namely, if the movement vector V is obtained over a wide range of the image, the direction of the movement vector V is directed to the disappearance point. Thus, it is possible to calibrate the image taking direction by averaging the movement vector V in consideration with the error of the movement vector V etc., to thereby identifying the disappearance point and determine the corresponding pixel position.

As described above in detail, according to the image processing apparatus and method of the present invention, since the image in the forward direction of the presently traveling vehicle is taken by the image taking device and the distance to the road edge is obtained by the image process so as to calculate the road width etc., it is possible to improve the safety and the convenience of the vehicle e.g., securing the safe of the vehicle and obtaining the road width by means of a rather simple configuration.

Further, according to the navigation apparatus of the present invention, it is possible to improve the function of the navigation apparatus by warning to the driver that the vehicle is close to the road edge, warning the change of the traffic lane based on the judgment for the traffic lane, storing the road width data and so on.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-211273 filed on Jul. 26, 1999 including the specification, claims, drawings and summary is incorporated herein by reference in its entirety.

What is claimed is:

1. An image processing apparatus comprising:
an image taking device for taking an image in a forward direction of a movable body and outputting an image signal corresponding to the taken image;
a movement vector detecting device for detecting a movement vector for each area of the image taken by said image taking device, on the basis of the image signal while said movable body is moving; and
a distance calculating device for setting a standard line at a predetermined image position crossing a road edge with respect to the image taken by said image taking device, and calculating the distance to the road edge on the basis of a distribution of the movement vector on the standard line.

2. An image processing apparatus according to claim 1, further comprising a road width calculating device for calculating a road width of the road, on which said movable body is moving, on the basis of the distance to the road edge calculated by said distance calculating device.

3. An image processing apparatus according to claim 1, further comprising a margin degree judging device for judging a degree of margin with respect to the road edge of the road, on which said movable body is moving, on the basis of the distance to the road edge calculated by said distance calculating device.

4. An image processing apparatus according to claim 1, further comprising a calibration device for calibrating an image taking direction of said image taking device on the basis of the detected movement vector.

5. An image processing apparatus according to claim 1, wherein
the image signal comprises frame image data, which has a predetermined frame cycle, as a unit, and
said movement vector detecting device detects the movement vector on the basis of two consecutive frame image data.

6. An image processing method of performing an image process on the basis of an image signal, which is outputted from an image taking device for taking an image in a forward direction of a movable body and outputting the image signal corresponding to the taken image, said image processing method comprising:

a movement vector detecting process of detecting a movement vector for each area of the image taken by said image taking device, on the basis of the image signal while said movable body is moving; and a distance calculating process of setting a standard line at a predetermined image position crossing a road edge with respect to the image taken by said image taking device, and calculating the distance to the road edge on the basis of a distribution of the movement vector on the standard line.

7. An image processing method according to claim 6, further comprising a road width calculating process of calculating a road width of the road, on which said movable body is moving, on the basis of the distance to the road edge calculated by said distance calculating process.

8. An image processing method according to claim 6, further comprising a margin degree judging process of judging a degree of margin with respect to the road edge of the road, on which said movable body is moving, on the basis of the distance to the road edge calculated by said distance calculating process.

9. An image processing method according to claim 6, further comprising a calibration process of calibrating an image taking direction of said image taking device on the basis of the detected movement vector.

10. An image processing method according to claim 6, wherein the image signal comprises frame image data, which has a predetermined frame cycle, as a unit, and said movement vector detecting process detects the movement vector on the basis of two consecutive frame image data.

11. A navigation apparatus for performing a route guidance from a present position of a vehicle to a destination on the basis of map data, comprising:

a sensor device including a vehicle speed sensor for detecting a moving speed of said vehicle;

an image taking device for taking an image in a forward direction of said vehicle and outputting an image signal corresponding to the taken image;

a movement vector detecting device for detecting a movement vector for each area of the image taken by said image taking device, on the basis of the image signal while said vehicle is moving; and a distance calculating device for setting a standard line at a predetermined image position crossing a road edge with respect to the image taken by said image taking device, and calculating the distance to the road edge on the basis of the detected moving speed and a distribution of the movement vector on the standard line.

12. A navigation apparatus according to claim 11, further comprising a warning device for warning that said vehicle is close to the road edge if the calculated distance to the road edge is smaller than a threshold value, which is set in advance.

13. A navigation apparatus according to claim 11, further comprising:

a margin degree judging device for judging a degree of margin with respect to the road edge of the road, on which said movable body is moving, on the basis of the distance to the road edge calculated by said distance calculating device; and a warning device for warning that said vehicle is close to the road edge if the judged degree of margin is smaller than a predetermined standard value.

14. A navigation apparatus according to claim 11, further comprising a road width calculating device for calculating a road width of the road, on which said vehicle is moving, on the basis of the calculated distance to the road edge.

15. A navigation apparatus according to claim 14, further comprising a road width data memory for storing road width data corresponding to the calculated road width in correlation with the map data such that the road width data can be updated.

16. A navigation apparatus according to claim 14, further comprising a a traffic lane judging device for judging a traffic lane, on which said vehicle is presently moving, on the basis of calculation results of said distance calculating device and said road width calculating device; and a warning device for warning an appropriate traffic lane, on which said vehicle is to move, by correlating the judged traffic lane with a route to the destination.

17. A navigation apparatus according to claim 16, wherein said warning device warns the appropriate traffic lane if the judged traffic lane is not coincident with the appropriate traffic lane.

18. A navigation apparatus according to claim 16, wherein said warning device warns that the judged traffic lane is coincident with the appropriate traffic lane if the judged traffic lane is coincident with the appropriate traffic lane.

19. A program storage device readable by a computer, tangibly embodying a program of instructions executable by the computer to perform an image process on the basis of an image signal, which is outputted from an image taking device for taking an image in a forward direction of a movable body and outputting the image signal corresponding to the taken image, said image process comprising:

a movement vector detecting process of detecting a movement vector for each area of the image taken by said image taking device, on the basis of the image signal while said movable body is moving; and a distance calculating process of setting a standard line at a predetermined image position crossing a road edge with respect to the image taken by said image taking device, and calculating the distance to the road edge on the basis of a distribution of the movement vector on the standard line.

20. A computer data signal embodied in a carrier wave and representing a series of instructions which cause a computer to perform an image process on the basis of an image signal, which is outputted from an image taking device for taking an image in a forward direction of a movable body and outputting the image signal corresponding to the taken image, said image process comprising:

a movement vector detecting process of detecting a movement vector for each area of the image taken by said image taking device, on the basis of the image signal while said movable body is moving; and a distance calculating process of setting a standard line at a predetermined image position crossing a road edge with respect to the image taken by said image taking device, and calculating the distance to the road edge on the basis of a distribution of the movement vector on the standard line.

* * * * *

UNITED STATES PATENT AND TRADEMARK OFFICE
CERTIFICATE OF CORRECTION

PATENT NO.   : 6,753,902 B1
DATED        : June 22, 2004
INVENTOR(S)  : Kashiwazaki It is certified that error appears in the above-identified patent and that said Letters Patent is hereby corrected as shown below:

Title page,
Item [*] Notice, delete the phrase "by 826 days" and insert -- by 869 days --

Signed and Sealed this

Fifth Day of April, 2005

JON W. DUDAS
*Director of the United States Patent and Trademark Office*